Patented June 17, 1941

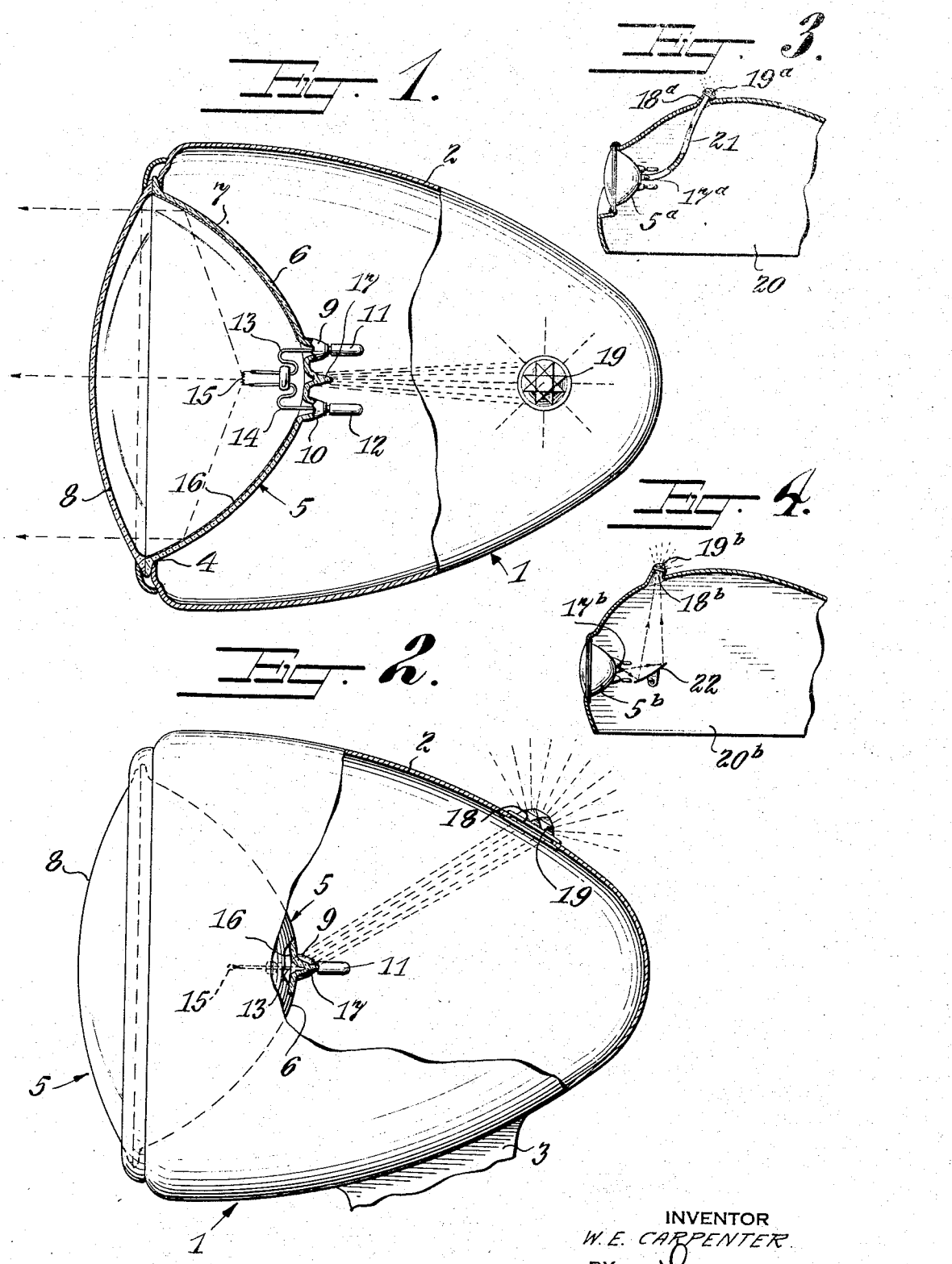

2,245,755

UNITED STATES PATENT OFFICE 2,245,755

HEADLIGHT WITH INDICATOR

Walter E. Carpenter, West Caldwell, N. J., assignor to Westinghouse Electric & Manufacturing Company, East Pittsburgh, Pa., a corporation of Pennsylvania Application December 9, 1937, Serial No. 178,944

12 Claims. (Cl. 240—8.4)

This invention relates to a visual indicator and, more particularly, to an arrangement whereby the driver of a motor vehicle may be able to tell when the headlights thereof are energized without leaving his seat.

The principal object of my invention, generally considered, is the provision of headlights, particularly adapted for automobiles, which give indications from the rear as to whether or not their lamps are energized.

Another object of my invention is the provision of a headlight, particularly for use on an automobile, in which the lamp thereof, when energized, allows some light to pass rearwardly to an aperture in the headlight housing, said aperture desirably being closed by a glass "jewel" which refracts the light received and gives a visual indication that the lamp is energized.

A further object of my invention is the provision of an automobile headlight in which the housing is provided with an aperture closed by a glass "jewel" which is positioned so as to be illuminated by light passing through a transparent exhaust tip of the lamp in said headlight, when the lamp is energized, thereby making a light which is visible from the rear, and showing by the absence of such a light, when the headlight switch is on, that the headlight lamp needs replacing or there is a defect in the circuit thereto.

Other objects and advantages of the invention, relating to the particular arrangement and construction of the various parts, will become apparent as the description proceeds.

Referring to the drawing illustrating my invention:

Fig. 1 is a partial plan and partial horizontal sectional view of an automobile headlight embodying my invention.

Fig. 2 is a partial side elevational and partial vertical sectional view of the headlight shown in Fig. 1.

Fig. 3 is a partial elevational view and partial sectional view of a lamp embedded in an automobile fender, and involving a modification of the arrangement shown in Fig. 2.

Fig. 4 is a view corresponding to Fig. 3, but showing another embodiment of my invention.

Referring to the drawing in detail, like parts being designated by like reference characters, and first considering the embodiment of my invention illustrated in Figs. 1 and 2, there is shown a headlight 1 comprising a lamp supporting housing or casing 2 which normally is supported from or mounted on an automobile, or motor vehicle, or fender thereof, not shown, by means of a bracket 3, only fragmentarily illustrated.

The housing 2 has a front opening 4 in which is received an incandescent electric lamp 5. The lamp 5 of the present embodiment is of the type in which a reflector portion 6 is formed as part of the bulb 7, the forward edge portion of said reflector portion 6 being united to a cover or lens portion 8 which completes the bulb 7, the lamp 5 being somewhat similar to that described and claimed in the Holloway application, Serial No. 114,746, filed December 8, 1936, and assigned to the Westinghouse Electric & Manufacturing Company.

In the present embodiment, the reflector portion 6 is constructed of glass, pressed or otherwise formed into a parabolic or paraboloidal shape, as is customary in lamp reflectors. The reflector portion 6 has bosses 9 and 10 to which are secured conductive posts 11 and 12, from which extend the lead-in conductors 13 and 14 for the light-giving filament 15. The filament 15 is focused with respect to the reflector portion 6, as described in the Holloway application previously referred to, forming in this instance, however, what is designated as a bipost lamp. Electrical energy is conducted to the posts 11 and 12 from the vehicle, on which the headlight is mounted, by clips or other connecting means, not shown.

In order to provide for the efficient reflection of light from the parabolic portion 6 of the lamp 5, the interior surface of said portion 6 is desirably coated with an opaque film of metal 16, such as aluminum, which efficiently reflects light, at the same time preventing it passing rearwardly through the glass portion 6. During the deposition of the metal 16 on the reflector portion 6, the exhaust tube portion 17 is either kept free of such metal, or metal deposited thereon is subsequently removed therefrom, so that a portion of the light from the filament 15, when the same is energized, is transmitted rearwardly to the inner surface of the housing 2 of the headlight 1.

The housing 2 is formed with an aperture 18 disposed in an upward and rearward portion thereof, said aperture being normally closed by what is generally termed a glass "jewel" 19, said "jewel" being so positioned that when the filament 15 is energized, light is transmitted through the exhaust tip 17 and a portion falls on said "jewel" which refracts the light upwardly and rearwardly, so as to be visible to the driver of the vehicle when seated behind the wheel. When the driver operates the switch to energize the headlights and notes a failure of the "jewel" 19 to emit light, he then knows that the lamp 5 is either burnt out or that there is a defect in the circuit thereto, so that he can promptly remedy the matter.

Referring now to the embodiment of my invention illustrated in Fig. 3, a construction is there disclosed in which a lamp 5ª, preferably constructed like the lamp 5 of the first embodiment, is imbedded in the fender 20 of an automobile, not shown, which functions like the housing 2 of the first embodiment, to make a headlight for said automobile.

In a construction of this character the glass jewel 19ª, in order to be visible by the motorist when at the wheel, has to be located approximately as illustrated; that is, near the top of the fender and closing an aperture 18ª therein. In this way it is considerably removed from the lamp 5ª and direct light from the exhaust tip 17ª would not ordinarily illuminate the jewel sufficiently for the desired purpose. In accordance with the present embodiment of my invention, I therefore connect said exhaust tip to the jewel, for the conduction of light therebetween, by means of a piece of glass cane, tubing, or other transparent solid material, such as Lucite, designated by the reference character 21.

Referring now to the embodiment of my invention illustrated in Fig. 4, a construction is there disclosed which, like that of Fig. 3, involves the imbedding of a lamp 5ᵇ, preferably constructed like the lamp 5 of the first embodiment, in an automobile fender 20ᵇ which acts as a lamp housing to produce a headlight, as in the preceding embodiment. In the present case, however, while the jewel 19ᵇ, as in the preceding embodiment, is connected to the upper portion of the fender, closing an aperture 18ᵇ therein, I provide for the transmission of light thereto from the exhaust tip 17ᵇ by reflection from a preferably adjustable mirror 22, located, as illustrated, so as to desirably concentrate the light from the exhaust tip on the jewel 19ᵇ, thereby illuminating it when the lamp 5ᵇ is energized.

From the foregoing, it will be seen that I have provided an improved headlight which gives a visual indication, from the rear, of the condition of the enclosed lamp, thereby allowing the driver to promptly attend to any necessary replacement on account of the lamp burning out.

Although preferred embodiments of my invention have been disclosed, it will be understood that modifications may be made within the spirit and scope of the appended claims.

I claim:

1. An automobile headlight comprising a housing and a lamp formed with a reflector portion and a lens portion, said reflector portion being constructed of transparent material coated on the inside with opaque light-reflective material, and having an exhaust tip free of said reflective material, said lamp being mounted in said housing, an aperture formed in said housing rearwardly of said lamp, and a glass jewel closing said aperture whereby it receives light through said exhaust tip when the lamp is lit and is visible to the driver of the vehicle on which the headlight is mounted, as an indication from the rear of whether or not the lamp is energized.

2. In combination with a headlight housing, an incandescent electric lamp comprising a bulb formed of a reflector portion, the interior of which is coated with metal, providing an efficient light-reflecting surface, a window portion sealed thereto, and a filament centered with respect to said reflecting surface and sealed in said bulb, said reflector portion having a transparent exhaust tip, and said housing having an aperture disposed rearwardly of said lamp and closed by a glass jewel, so that it receives light from said filament through said exhaust tip when the lamp is energized, and gives a visual indication to the driver of a car on which said headlight is mounted.

3. An automobile headlight comprising a housing, means for mounting said housing on said automobile, a lamp secured in said housing and formed with a reflector portion, said reflector portion being provided with a transparent exhaust tip, said housing having an aperture positioned rearwardly of said lamp so that it receives light through said exhaust tip, when the lamp is lit, and means adjacent said aperture for making said light visible from the rear as an indication of lamp condition.

4. In combination with the fender of an automobile, a headlight lamp imbedded therein and formed with a reflector portion, said reflector portion having a small transparent area, said fender having an aperture so positioned that it receives light through said area, when the lamp is lit, and means adjacent said aperture for making said light visible from the driver's seat, as an indication of lamp condition.

5. In combination with the fender of an automobile, a headlight lamp imbedded therein and formed with a reflector portion, said reflector portion having a small transparent area and said fender having an aperture closed by a glass jewel, and a piece of transparent solid material extending between said transparent area and jewel so that it receives light when the lamp is lit, and makes it visible from the driver's seat, as an indication of lamp condition.

6. In combination with the fender of an automobile, a headlight lamp imbedded therein and formed with a reflector portion, said reflector portion having a small transparent area and said fender having an aperture closed by a glass jewel, and a mirror positioned to reflect light, emitted by said transparent area, on said jewel, so that it receives light, when the lamp is lit, to make it visible from the driver's seat, as an indication of lamp condition.

7. A headlight comprising a housing, means for mounting said housing on an automobile, a lamp secured in said housing and formed with a reflector portion as part of its bulb, said reflector portion having a transparent exhaust tip area, said housing having an aperture positioned rearwardly of said lamp so that it receives light thru said area when the lamp is energized, and means adjacent said aperture for making said light visible from the rear to indicate lamp condition.

8. In combination with an automobile, a lamp support carried thereby, a head light lamp mounted in said support and having a portion of its bulb coated to form a reflector portion, said reflector portion having a transparent exhaust tip area and said support having an aperture disposed rearwardly of said lamp and closed by a glass jewel in the line of vision from the driver's seat, and a piece of transparent solid material extending substantially the entire distance between said transparent area and jewel so that the latter receives light when the lamp is lit, making it visible to a driver as an indication of lamp condition.

9. In combination with an automobile, a lamp support carried thereby, a headlight lamp mounted in said support and having a portion of its bulb coated to form a reflector portion, said reflector portion having a transparent exhaust tip area and said support having an aperture disposed rearwardly of said lamp and closed by a glass jewel in the line of vision from the driver's seat, and a mirror positioned to reflect light, emitted through said transparent area, onto said jewel, so that the latter is illuminated when the lamp is lit, and visible to a driver as an indication of lamp condition.

10. In combination with the fender of an automobile, a headlight lamp imbedded therein and formed with a reflector portion, a portion of said lamp having a small transparent area, said fender having an aperture so positioned that it receives light through said area, when the lamp is lit, and means adjacent said aperture for making said light visible from the driver's seat, as an indication of lamp condition.

11. In combination with the fender of an automobile, a headlight lamp imbedded therein and formed with a reflector portion, a portion of said lamp having a small transparent area and said fender having an aperture closed by a glass jewel, and a piece of transparent solid material extending between said transparent area and jewel so that it receives light when the lamp is lit, and makes it visible from the driver's seat, as an indication of lamp condition.

12. In combination with the fender of an automobile, a headlight lamp imbedded therein and formed with a reflector portion, a portion of said lamp having a small transparent area and said fender having an aperture closed by a glass jewel, and a mirror positioned to reflect light, emitted by said transparent area, on said jewel, so that it receives light, when the lamp is lit, to make it visible from the driver's seat, as an indication of lamp condition.

WALTER E. CARPENTER.